(12) United States Patent
de Ruijter et al.

(10) Patent No.: US 11,750,360 B2
(45) Date of Patent: Sep. 5, 2023

(54) APPARATUS FOR RADIO-FREQUENCY RECEIVER WITH MULTIPLE OPERATIONAL MODES AND ASSOCIATED METHODS

(71) Applicant: Silicon Laboratories Inc., Austin, TX (US)

(72) Inventors: Hendricus de Ruijter, Austin, TX (US); Wentao Li, Austin, TX (US); Lauri Mikael Hintsala, Jokikunta (FI)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 15/868,855

(22) Filed: Jan. 11, 2018

(65) Prior Publication Data

US 2018/0159679 A1 Jun. 7, 2018

Related U.S. Application Data

(63) Continuation-in-part of application No. 15/370,674, filed on Dec. 6, 2016, and a continuation-in-part of application No. 15/370,693, filed on Dec. 6, 2016.

(51) Int. Cl.
*H04L 7/04* (2006.01)
*H04J 3/06* (2006.01)
*H04W 52/02* (2009.01)
*H04L 69/22* (2022.01)
*H04W 4/80* (2018.01)

(52) U.S. Cl.
CPC ............ *H04L 7/042* (2013.01); *H04J 3/0658* (2013.01); *H04L 69/22* (2013.01); *H04W 52/0229* (2013.01); *H04W 4/80* (2018.02); *Y02D 30/70* (2020.08)

(58) Field of Classification Search
CPC ....... H04L 7/042; H04L 27/22; H04L 27/227; H04L 27/2278; H04L 27/233; H04L 27/2331; H04L 27/2649; H04L 69/22; H04J 3/0658; H04W 4/80; H04W 52/0229; Y02D 70/00; Y02D 70/10; Y02D 70/14; Y02D 70/142; Y02D 70/144
USPC ....... 375/224, 225, 227, 324–326, 340, 341, 375/343–345, 355, 360, 364; 370/349, 370/350; 455/138, 139, 226.1, 226.2, 455/336, 337; 324/750.01, 750.15, 324/750.19
See application file for complete search history.

(56) References Cited

U.S. PATENT DOCUMENTS

| | | | |
|---|---|---|---|
| 5,856,986 A * | 1/1999 | Sobey | G11B 20/10009 714/744 |
| 8,929,011 B1 * | 1/2015 | Song | G11B 20/10222 360/39 |
| 10,333,750 B2 * | 6/2019 | de Ruijter | H04W 8/005 |
| 10,389,482 B2 | 8/2019 | de Ruijter | |
| 10,812,302 B2 | 10/2020 | de Ruijter | |

(Continued)

OTHER PUBLICATIONS

U.S. Appl. No. 15/370,674, filed Dec. 2016, de Ruijter.

*Primary Examiner* — Young T. Tse
(74) *Attorney, Agent, or Firm* — Law Offices of Maximilian R. Peterson

(57) ABSTRACT

An apparatus includes a radio frequency (RF) receiver to receive packets. The RF receiver includes first and second synchronization field detectors (SFDs). The first and second SFDs detect synchronization headers generated using first and second physical layer (PHY) modes, respectively.

20 Claims, 12 Drawing Sheets

(56) References Cited

U.S. PATENT DOCUMENTS

| | | |
|---|---|---|
| 2004/0037257 A1 | 2/2004 | Ngo |
| 2004/0218568 A1 | 11/2004 | Goodall |
| 2006/0093070 A1* | 5/2006 | Ibrahim ................. H03D 3/006 |
| | | 375/324 |
| 2006/0270355 A1* | 11/2006 | Mak ....................... H04L 43/00 |
| | | 455/67.11 |
| 2007/0047666 A1 | 3/2007 | Trachewsky |
| 2009/0094499 A1* | 4/2009 | Deoka .................... G11B 20/18 |
| | | 714/752 |
| 2009/0135772 A1 | 5/2009 | Kwon |
| 2009/0190695 A1* | 7/2009 | Yokokawa ............ H04L 1/0054 |
| | | 375/322 |
| 2009/0225734 A1 | 9/2009 | Stephens |
| 2010/0091704 A1 | 4/2010 | Ianev |
| 2010/0202334 A1 | 8/2010 | Soliman |
| 2010/0303183 A1 | 12/2010 | Desai |
| 2011/0116534 A1* | 5/2011 | Seibert .................... H04L 7/042 |
| | | 375/224 |
| 2011/0142030 A1 | 6/2011 | Pietsch |
| 2012/0207231 A1* | 8/2012 | Zhang ................. H04L 27/2613 |
| | | 375/260 |
| 2013/0100897 A1* | 4/2013 | Negus .................... H01Q 25/00 |
| | | 370/329 |
| 2013/0202014 A1 | 8/2013 | Schmidl |
| 2014/0036702 A1 | 2/2014 | Van Wyk |
| 2015/0022263 A1 | 1/2015 | Kamata |
| 2015/0237178 A1 | 8/2015 | Zhang |
| 2015/0334668 A1* | 11/2015 | Weber ................. H04W 56/001 |
| | | 455/404.1 |
| 2016/0241425 A1 | 8/2016 | Xin |
| 2016/0277173 A1 | 9/2016 | Dutronc |
| 2018/0048499 A1 | 2/2018 | de Ruijter |
| 2019/0268190 A1 | 8/2019 | de Ruijter |

\* cited by examiner

APPARATUS FOR RADIO-FREQUENCY RECEIVER WITH MULTIPLE OPERATIONAL MODES AND ASSOCIATED METHODS

CROSS-REFERENCE TO RELATED APPLICATIONS

The present application is a continuation-in-part of U.S. patent application Ser. No. 15/370,674, filed on Dec. 6, 2016, titled "Radio-Frequency Apparatus with Digital Signal Arrival Detection and Associated Methods." The present application is also a continuation-in-part of U.S. patent application Ser. No. 15/370,693, filed on Dec. 6, 2016, titled "Radio-Frequency Apparatus with Improved Power Consumption and Associated Methods." The foregoing applications are hereby incorporated by reference in their entireties for all purposes.

TECHNICAL FIELD

The disclosure relates generally to communication apparatus and associated methods. More particularly, the disclosure relates to apparatus for receivers with physical layer (PHY) selection, and associated methods.

BACKGROUND

With the increasing proliferation of wireless technology, such as Wi-Fi, Bluetooth, and mobile or wireless Internet of things (IoT) devices, more devices or systems incorporate RF circuitry, such as receivers and/or transmitters. To reduce the cost, size, and bill of materials, and to increase the reliability of such devices or systems, various circuits or functions have been integrated into integrated circuits (ICs). For example, ICs typically include receiver and/or transmitter circuitry.

Some wireless communication standards define a preamble for a wireless packet, which is a predefined data pattern that a receiver can use to detect and settle its control loops. The control loops may include the Automatic Gain Control (AGC), Automatic Frequency Compensation (AFC), and Bit Clock Recovery (BCR). After the receiver detects the end of the preamble, the receiver is prepared to receive a full packet including payload data. Some receivers use a preamble detector to detect the arrival of a frame. In response to the preamble detector signaling the detection of the preamble, the receiver begins looking for the next portion of the frame.

The description in this section and any corresponding figure(s) are included as background information materials. The materials in this section should not be considered as an admission that such materials constitute prior art to the present patent application.

SUMMARY

A variety of apparatus and associated methods are contemplated according to exemplary embodiments. According to one exemplary embodiment, an apparatus includes an RF receiver to receive packets. The RF receiver includes first and second synchronization field detectors (SFDs). The first and second SFDs detect synchronization headers generated using first and second PHY modes, respectively.

According to another exemplary embodiment, an apparatus includes an RF receiver to receive packets transmitted using one of first and second PHY modes. The RF receiver includes an SFD to detect a synchronization header generated using either the first PHY mode or the second PHY mode. The RF receiver further includes a demodulator to demodulate a packet in the received packets using either the first PHY mode or the second PHY mode depending on whether the SFD detects that the synchronization header is generated using the first PHY mode or the second PHY mode, respectively.

According to another exemplary embodiment, a method of operating an RF receiver to receive packets includes using first and second SFDs to detect synchronization headers generated using the first and second PHY modes, respectively.

BRIEF DESCRIPTION OF THE DRAWINGS

The appended drawings illustrate only exemplary embodiments and therefore should not be considered as limiting the scope of the application or the claims. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

DETAILED DESCRIPTION

Figure 1:
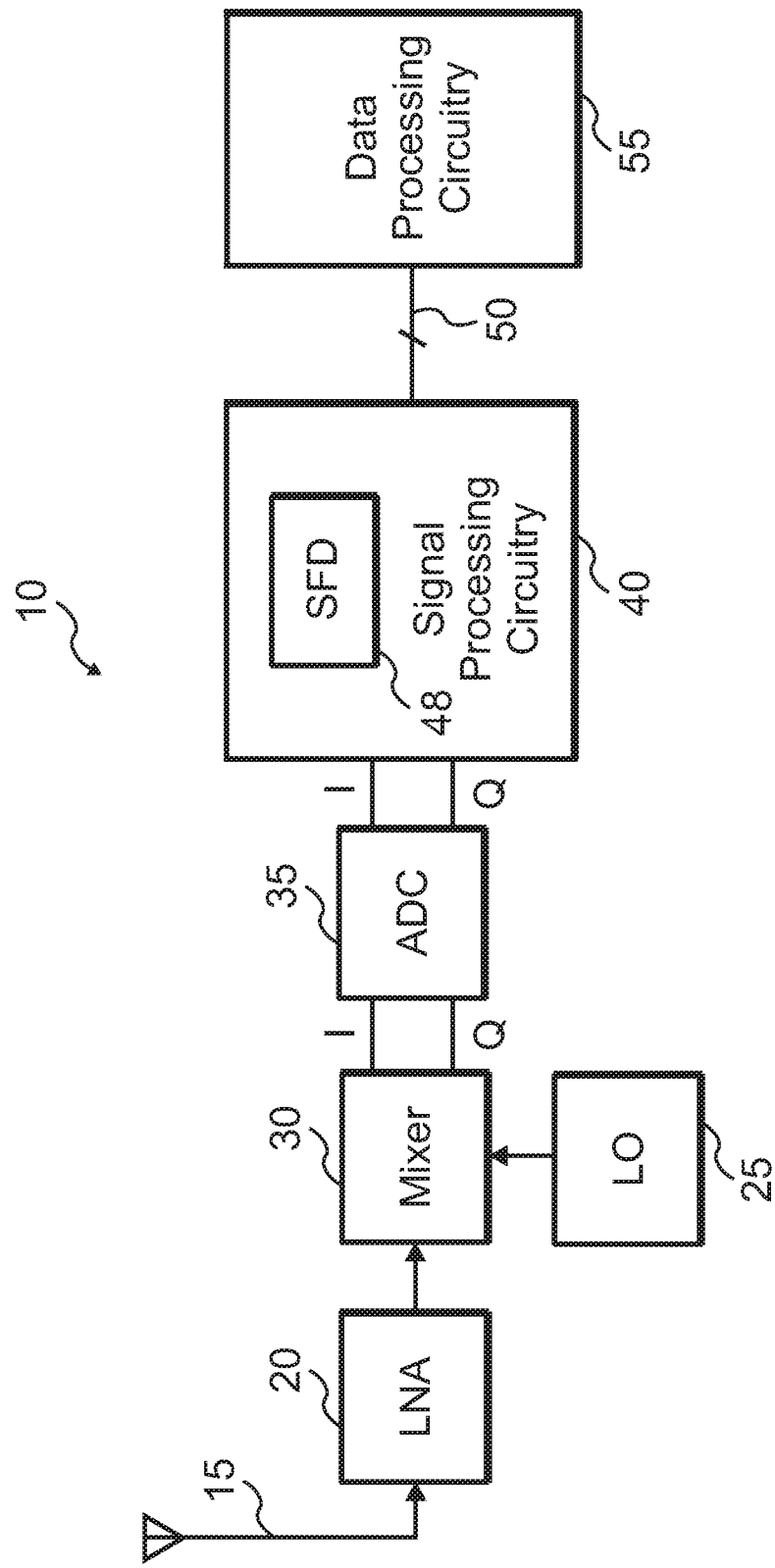
FIG. 1 illustrates a circuit arrangement for a receiver according to an exemplary embodiment.

The disclosure relates generally to communication apparatus and associated methods. More particularly, the disclosure relates to apparatus for receivers with physical layer (PHY) selection, and associated methods.

In some RF communication standards, such as Bluetooth 5.0, the advertising packet can be transmitted using either the 1M (one mega-bits per second, or 1 Mbps) uncoded PHY (or PHY mode) or the low energy (LE) coded PHY or PHY mode (one mega-chips per second, or 1 Mcps), as known to persons of ordinary skill in the art. A node (RF receiver or RX) that scans the advertising channels may alternate between these two PHY modes. In other words, the demodulator in the receiver may be configured to receive the 1M uncoded PHY and try to receive the advertising packet.

If no advertising packet is received after a certain period of time, the receiver will re-configure its demodulator to receive the LE coded PHY, and try again to receive the advertising channel. If no advertising packet is received after a certain period of time, the receiver will re-configure its demodulator back to receive the 1M LE uncoded PHY.

This process is repeated until the advertising packet is received. As such, the connection time may be relatively long before it is established because the advertising packet may be transmitted using a different PHY mode than the PHY mode that the receiver uses. The power consumption of the RF receiver will also increase as a result.

RF receivers according to various embodiments allow relatively fast (or even immediate or near immediate as realized with physical, real-life circuitry) reception of the advertising packet regardless of the PHY mode that was used to transmit the advertising packet. As a result, RF receivers according to various embodiments provide relatively short connection times, and consume less power during connection set-up. RF receivers according to various embodiments are also more efficient in terms of hardware and die area.

In various embodiments, RF receivers use at least two synchronization field detectors (SFDs) (or synchronization header (SHR) detectors). The SFDs operate concurrently, which allows one SFD to attempt to detect uncoded packets and the other SFD to detect encoded or coded packets.

The SFD that triggers first will cause (e.g., via a controller or directly) the RF receiver's demodulator to be configured to the PHY mode associated with the SFD (coded or uncoded) to receive the remainder of the packet. As an example, consider the case of physical layers PHY1 and PHY2, and associated SFD1 and SFD2.

SFD1 is capable of detecting (or is designed or configured to detect) to the synchronization field (SF) or SHR of PHY1 (the SF of packets generated using the PHY1 mode), whereas SFD2 is capable of detecting (or is designed or configured to detect) to the SF or SHR of PHY2 (the SF of packets generated using the PHY2 mode). If SFD1 triggers first, the RF receiver will configure its demodulator (e.g., via a controller) to receive packets using the PHY1 mode. Conversely, if SFD2 triggers first, the RF receiver will configure its demodulator to receive packets using the PHY2 mode.

Note that there a relatively small probability of a false triggering (false positive) of an SFD exists. Hence, it may be beneficial to keep all (or at least two) SFDs active or operating in case successive SF or SHR detections occur after a false triggering.

For example, after an SF or SHR detection, RF the receiver compares the received synchronization word (or Access Address in Bluetooth LE (BLE)) with the expected synchronization word. If the SF or SHR detection was a false positive, it is unlikely that the synchronization word will be properly detected. The receiver, however, may still be responsive to the successive SHR detections using memory (e.g., random access memory, or RAM, described below) "rewind." Once the received synchronization word matches the expected synchronization word the SFDs may be disabled to save energy (reduce power consumption of the RF receiver), and the RF receiver proceeds to receive the remainder of the packet.

Memory rewind is known to persons of ordinary skill in the art. Briefly, after the receiver is enabled (e.g., signal RX_enable is asserted), the SFD runs continuously in real time (as opposed to data saved in memory). Furthermore, after RX_enable is asserted, samples of the received signal are loaded into memory (the samples are oversampled).

Once the SFD triggers (symbol timing and start of the CI field in the packet are found), a pointer pointing to locations in the memory is positioned at the beginning of the Access Address field. These operations constitutes memory rewind. The memory contents can now be provided to a decoder in the RF receiver (e.g., a Viterbi decoder, which is well known to persons of ordinary skill in the art), and the demapper (well known to persons of ordinary skill in the art) to demodulate the received Access Address field.

If the received Access Address field matches the expected Access Address field, then the remainder of the packet will be processed the same way, i.e., using the decoder and the demapper (well know to persons of ordinary skill in the art). If not, a false detect condition may exist, and the SFD will conduct another search for the next SF detection.

Note that in various embodiments, the SFD may be used for tracking purposes, as desired, which is useful when the transmit RF frequency drifts relative to the RF receiver's clock signal. Furthermore, note that although various embodiments are described with respect to the Bluetooth (and its variations, such as BLE) communication standards or protocols, application of the disclosed concepts to other RF communication techniques, standards, protocols, etc., are possible and contemplated, as persons of ordinary skill in the art will understand. Generally, the disclosed concepts may be used in situations where SFDs are used to detect more than one type of packet or more than one type of encoding (e.g., coded versus uncoded).

FIG. 1 illustrates a circuit arrangement for a receiver 10 according to an exemplary embodiment. Receiver 10 receives RF signals via antenna 15. The RF signals feed an input of low noise amplifier (LNA) 20. LNA 20 provides low-noise amplification of the RF signals, and provides amplified RF signals to mixer 30.

Mixer 30 performs frequency translation or shifting of the RF signals, using a reference or local oscillator (LO) frequency provided by LO 25. For example, in some embodiments, mixer 30 translates the RF signal frequencies to baseband frequencies. As another example, in some embodiments, mixer 30 translates the RF signal frequencies to an intermediate frequency (IF).

Mixer 30 provides the translated output signal as a set of two signals, an in-phase (I) signal, and a quadrature (Q) signal. The I and Q signals are analog time-domain signals. Analog to digital converter (ADC) 35 converts the I and Q signals to digital I and Q signals. In exemplary embodiments, ADC 35 may use a variety of signal conversion techniques. For example, in some embodiments, ADC 35 may use delta-sigma (or sometimes called sigma-delta) analog to digital conversion.

ADC 35 provides the digital I and Q signals to signal processing circuitry 40. Generally speaking, signal processing circuitry 40 performs processing on the digital I and Q signals, for example, digital signal processing (DSP). In exemplary embodiments, signal processing circuitry 40 includes SFD 48. SFD 48 may include two or more SFDs, as noted above.

Signal processing circuitry 40 provides information, such as the demodulated data, to data processing circuitry 55 via link 50. Data processing circuitry 55 may perform a variety of functions (e.g., logic, arithmetic, etc.). For example, data processing circuitry 55 may use the demodulated data in a program, routine, or algorithm (whether in software, firmware, hardware, or a combination) to perform desired control or data processing tasks.

In some embodiments, data processing circuitry 55 may perform control of other circuitry, sub-system, or systems (not shown). In some embodiments, data processing circuitry 55 may provide the data (after processing, as desired, for example, filtering) to another circuit (not shown), such as a transducer, display, etc.

In exemplary embodiments, link 50 may take a variety of forms. For example, in some embodiments, link 50 may constitute a number of conductors or coupling mechanisms, such as wires, cables, printed circuit board (PCB) traces, etc. Through link 50, signal processing circuitry 40 and data processing circuitry 55 may exchange information, such as the demodulated data, control information or signals, status signals, etc., as desired.

Figure 2:
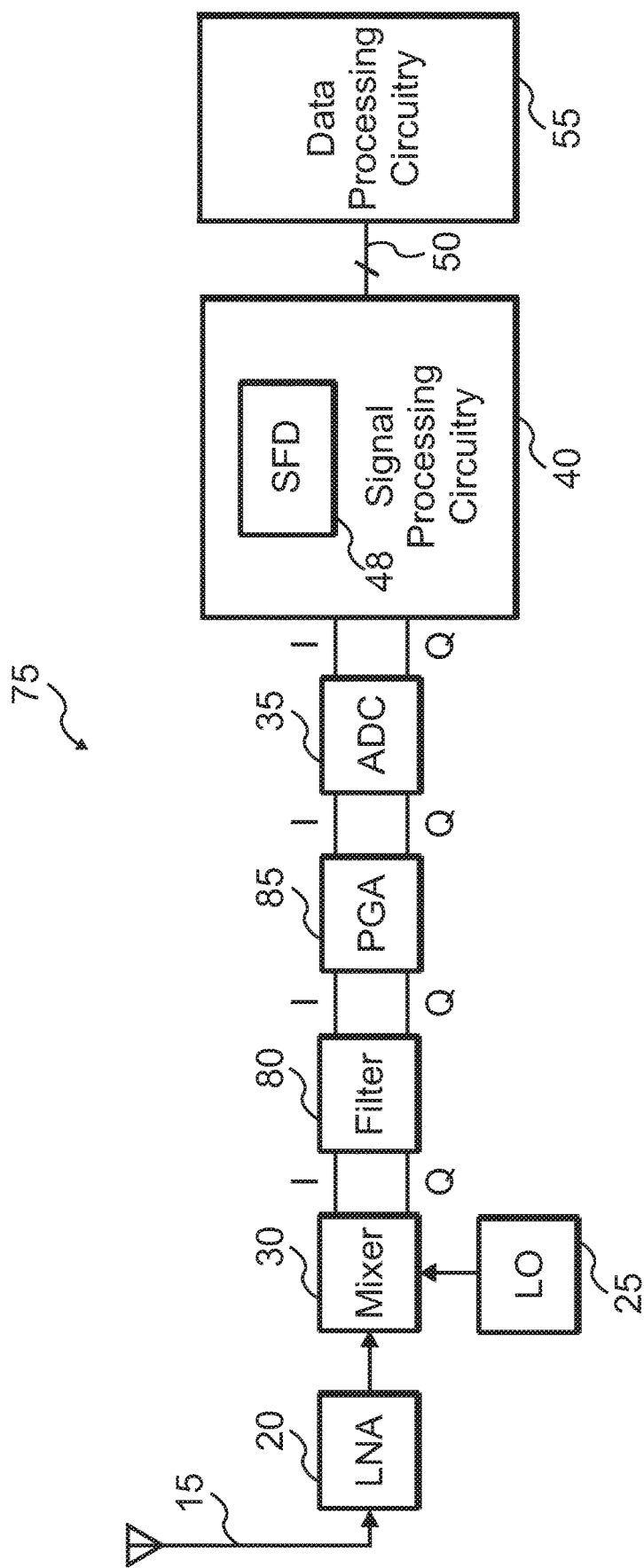
FIG. 2 depicts a circuit arrangement for a receiver according to an exemplary embodiment.

FIG. 2 depicts a circuit arrangement for a receiver 75 according to an exemplary embodiment. Receiver 75 generally has a similar architecture as receiver 10 (see FIG. 1). Thus, similar to the receiver in FIG. 1, receiver 75 in FIG. 2 includes SFD 48 which, as noted, may include two or more SF detectors. Referring again to FIG. 2, receiver 75 includes a filter 80 and a programmable gain amplifier (PGA) 85. Filter 80 provides filtering of the RF or baseband signal at the output of mixer 30. PGA 85 provides programmable gain for the filtered signal at the output of filter 80.

In some embodiments, PGA 85 has a gain that is programmable for different input levels of the RF signals received by antenna 15. In some embodiments, PGA 85 has a gain that is programmable for different frequency bands of the RF signals received by antenna 15. In some embodiments, PGA 85 may include more than one stage of amplification, for example, two or more "slices" of amplifier circuitry coupled in a cascade configuration, as desired. The gain of the various stages may be programmed in a similar or independent manner, as desired.

Note that variations of receiver 75 are possible and contemplated in exemplary embodiments. For example, in some embodiments, receiver 75 may include filter 80, but not PGA 85. Conversely, as another example, in some embodiments, receiver 75 may include PGA 85, but not filter 80. Conversely, as yet another example, in some embodiments, receiver 75 may swap the order of PGA 85 and filter 80. Other possibilities exist, for example, including one or more filters between antenna 15 and LNA 20 to facilitate accommodating several RF signal bands, etc.

Figure 3:
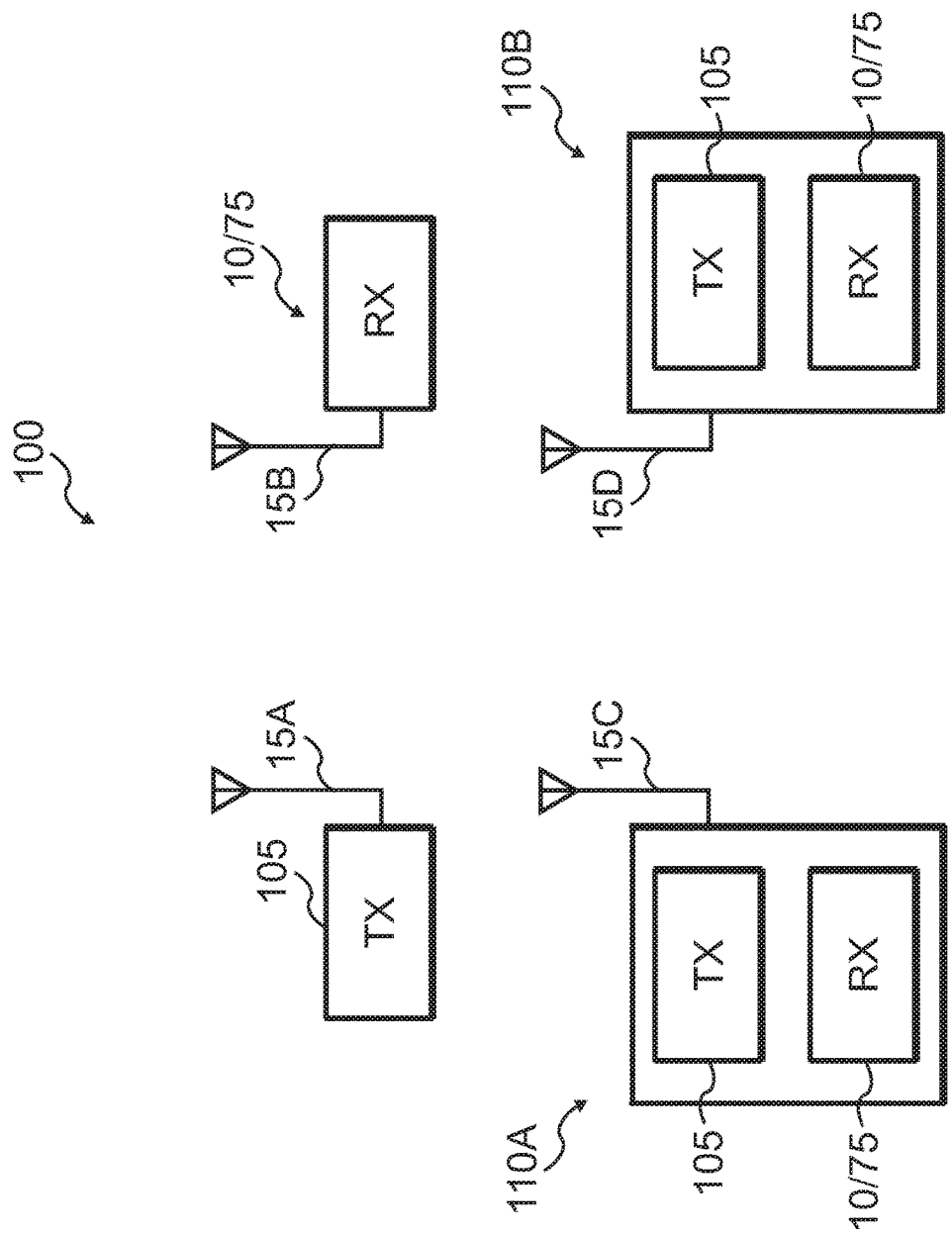
FIG. 3 shows a system for radio communication according to an exemplary embodiment.

Receivers according to exemplary embodiments may be used in a variety of communication arrangements, systems, sub-systems, networks, etc., as desired. FIG. 3 shows a system 100 for radio communication according to an exemplary embodiment.

System 100 includes a transmitter 105, coupled to antenna 15A. Via antenna 15A, transmitter 105 transmits RF signals. The RF signals may be received by receiver 10, described above (alternatively, the receiver may constitute receiver 75, also described above). In addition, or alternatively, transceiver 110A and/or transceiver 110B might receive (via receiver 10 or 75) the transmitted RF signals.

In addition to receive capability, transceiver 110A and transceiver 110B can also transmit RF signals. The transmitted RF signals might be received by receiver 10 or 75, either in the stand-alone receiver, or via the receiver circuitry of the non-transmitting transceiver.

Other systems or sub-systems with varying configuration and/or capabilities are also contemplated. For example, in some exemplary embodiments, two or more transceivers (e.g., transceiver 110A and transceiver 110B) might form a network, such as an ad-hoc network. As another example, in some exemplary embodiments, transceiver 110A and transceiver 110B might form part of a network, for example, in conjunction with transmitter 105.

Figure 4:
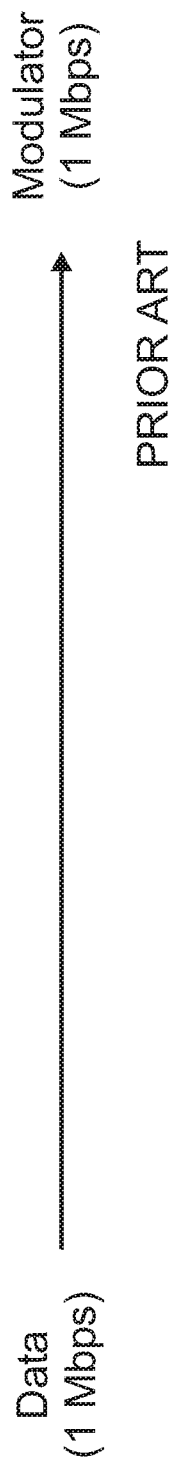
FIG. 4 shows a conventional technique for providing uncoded packets.

As noted above, at least in the Bluetooth (and variants) context, some packets may be uncoded and other packets may be coded. FIG. 4 shows a conventional technique for providing uncoded packets. More specifically, input data at 1 Mbps are passed on to the modulator at 1 Mbps, without any coding being applied to the data.

Bluetooth 5.0 introduces a second new, optional radio PHY mode called 'LE Coded,' which uses 1M chips per second, but uses a combination of forward error correction (FEC) encoding and spreading to lower the effective data rate to 125 kbps or 500 kbps. Besides data packets, the LE coded PHY mode can also be used in advertising packets.

Figure 5:
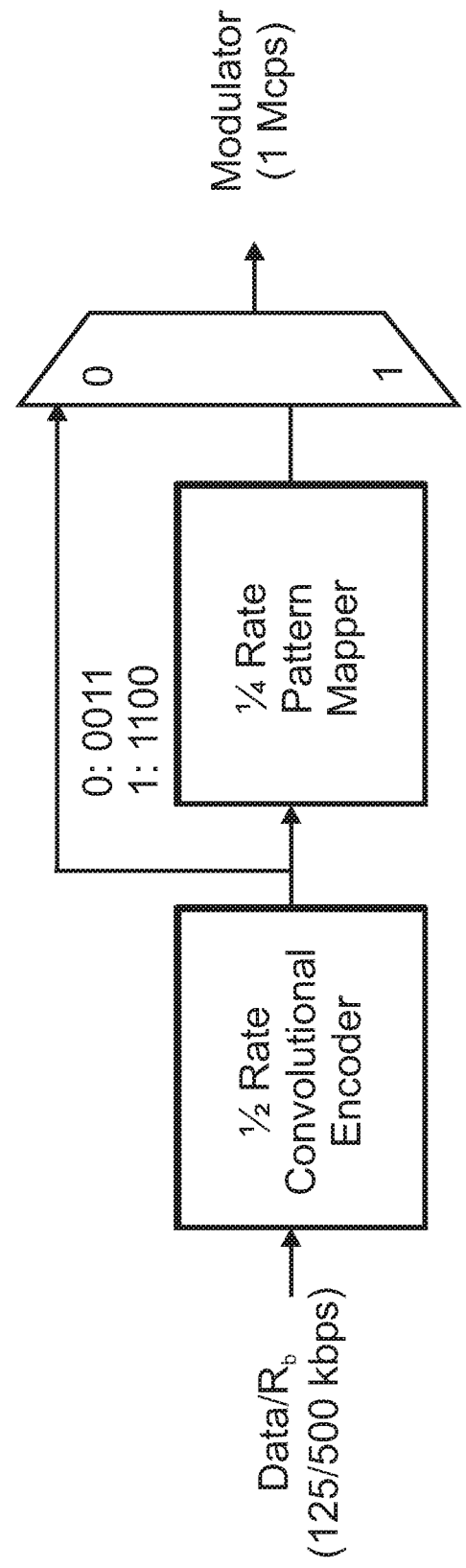
FIG. 5 shows a conventional technique for providing encoded packets.

FIG. 5 shows a conventional technique for providing encoded packets. Details of the circuit are well known to persons of ordinary skill in the art. Briefly, data at 125 or 500 kbps are provided to a half-rate convolutional encoder, the output of which drives an input of a multiplexer and a quarter-rate pattern mapper. The mapper maps binary 0 to 0011 and binary 1 to 1100, respectively.

The output of the mapper drives another input of the multiplexer. Thus, the multiplexer can provide to the modulator a 1 Mcps signal that is selected from the output of the half-rate convolutional encoder or the output of quarter-rate pattern mapper.

With Bluetooth 5.0 advertising may happen in 1 Mbps LE uncoded PHY or in LE coded PHY. When the 1M uncoded PHY mode is used, a 32-bit Advertising Access Address is transmitted uncoded. The same 32 bits Advertising Address is used for the LE-coded PHY mode, but it is coded and processed with pattern mapping, as discussed above. The over the air rate is the same as 1M uncoded PHY mode.

Figure 6:
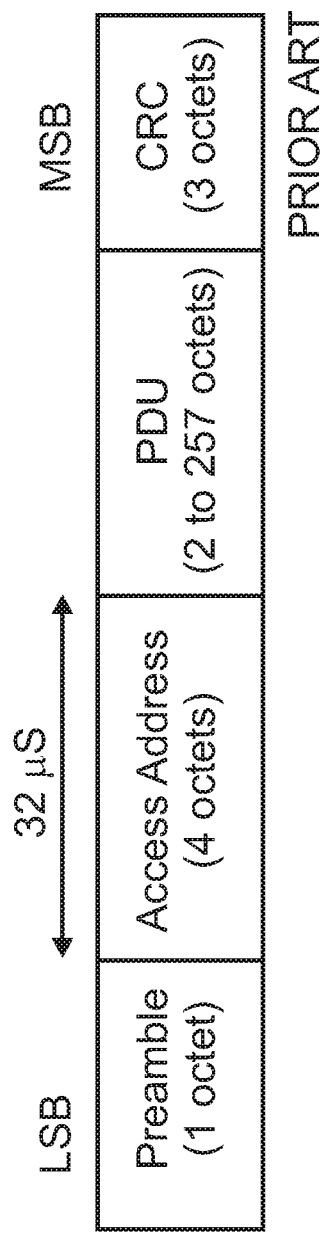
FIG. 6 shows a conventional uncoded packet.
Figure 7:
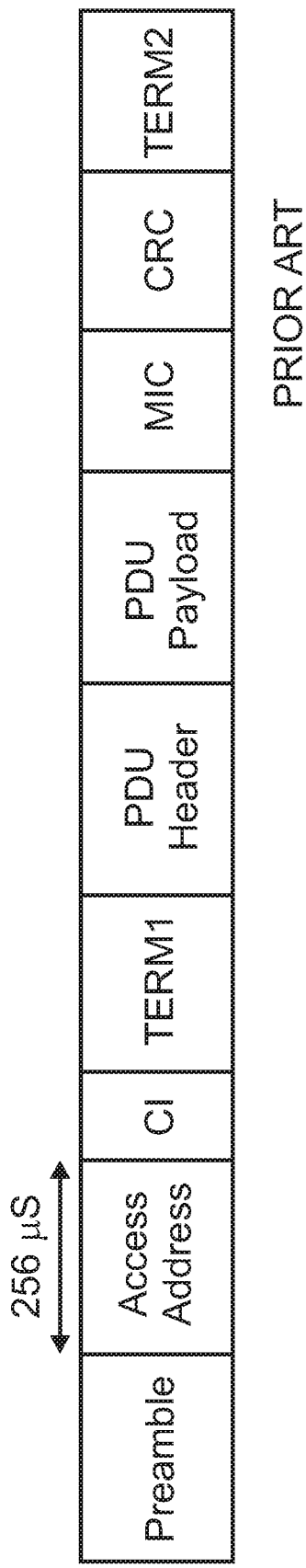
FIG. 7 shows a conventional encoded packet.

Thus, in LE uncoded PHY mode, the Access Address duration is 1 µs×32, or 32 µs. FIG. 6 shows such a conventional uncoded packet. Conversely, in the LE-coded PHY mode, the Access Address duration is 1 µs×32×2×4=256 µs (the 2 multiple and the 4 multiple arise, respectively, from the convolutional encoding and pattern mapping, discussed above). FIG. 7 shows such a conventional encoded packet. The details of the packets shown in FIG. 6 and in FIG. 7 are well known to persons of ordinary skill in the art.

As noted above, however, conventional RF receivers do not know ahead of time (before determining whether packets are coded or uncoded) which PHY mode they should use to demodulate packets. As noted, in various embodiments, two or more SFDs (or Access Address detectors or SHR detectors) run in parallel or concurrently. One SFD looks for the 32-µs (duration of Access Address) pattern related to the 1M uncoded packets, whereas the other SFD looks for the 256-µs (duration of Access Address) pattern related to the LE-coded packets. (Note that part of the preamble may be included in the pattern detection.)

Once one of the SFDs finds or detects either a coded or uncoded packet, the demodulator in the RF receiver is configured (or programmed or controlled or set up) to demodulate the remainder of the packet (i.e., the demodulator is configured to use the appropriate PHY mode for the detected type of packet (coded versus uncoded)) to demodulate the remainder of the packet. In this manner, any advertising packet, corresponding to coded or uncoded packets, can be received or detected relatively fast (or immediately, as noted above).

Figure 8:
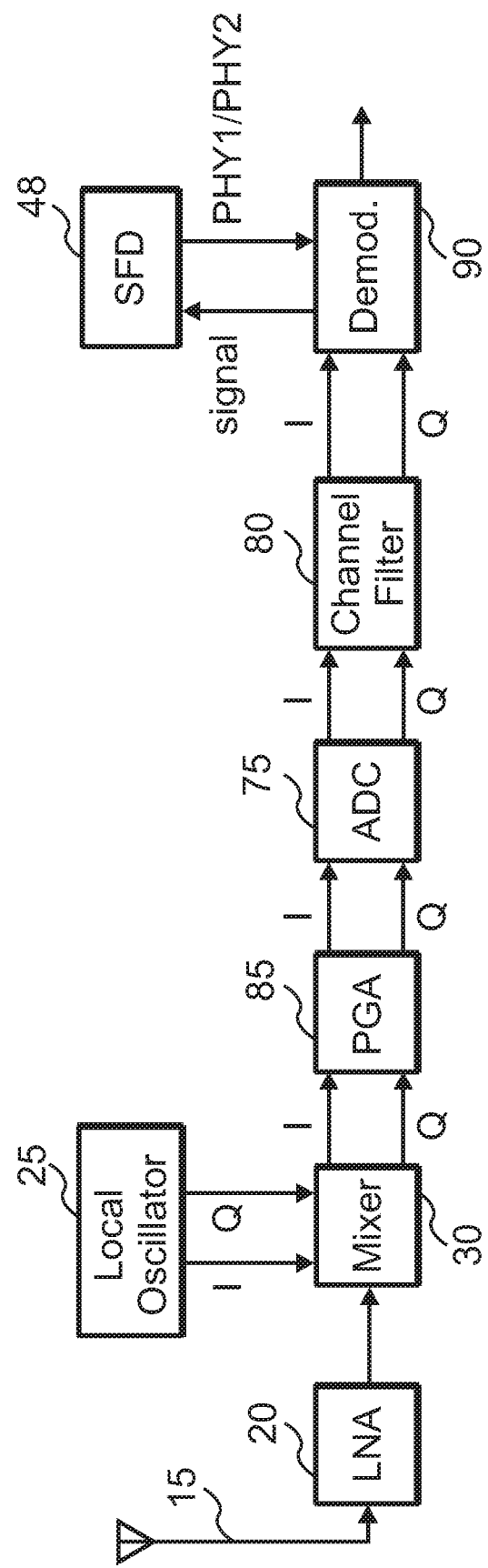
FIG. 8 shows a circuit arrangement for receive path circuitry according to an exemplary embodiment.

FIG. 8 shows a circuit arrangement for receive path circuitry according to an exemplary embodiment. The circuit arrangement in FIG. 8 is similar to the circuit arrangements for RF receivers shown in FIGS. 1 and 2 in that it includes antenna 15, LNA 20, mixer 30, local oscillator (LO) 25, filter 80, PGA 85, ADC 75, and SFD 48. Note, however, that in the circuit in FIG. 8, PGA 85 appears before filter 80. Furthermore, in FIGS. 1 and 2, filter 80 operates on analog signals at the output of mixer 30, whereas in the circuit of FIG. 8, filter 80 operates on the in-phase (I) and quadrature (Q) digital outputs of ADC 75. (Demodulator 90 in FIG. 8 would constitute part of signal processing circuitry 40 in FIG. 1 or FIG. 2.)

Referring again to FIG. 8, the receive path circuitry includes SFD 48. As noted above, SFD 48 includes at least two SFDs (or Access Address detectors or SHR detectors), which run in parallel or concurrently. In some embodiments, one SFD looks for uncoded packets (e.g., 1M uncoded Bluetooth packets), whereas another SFD looks for coded packets (e.g., LE-coded Bluetooth packets). As further noted above, when one of the SFDs detects a packet corresponding to a particular PHY mode used to transmit the packet, demodulator 90 is configured (e.g., by a controller (not shown)) to use a corresponding PHY mode to demodulate the rest of the packet.

Figure 9:
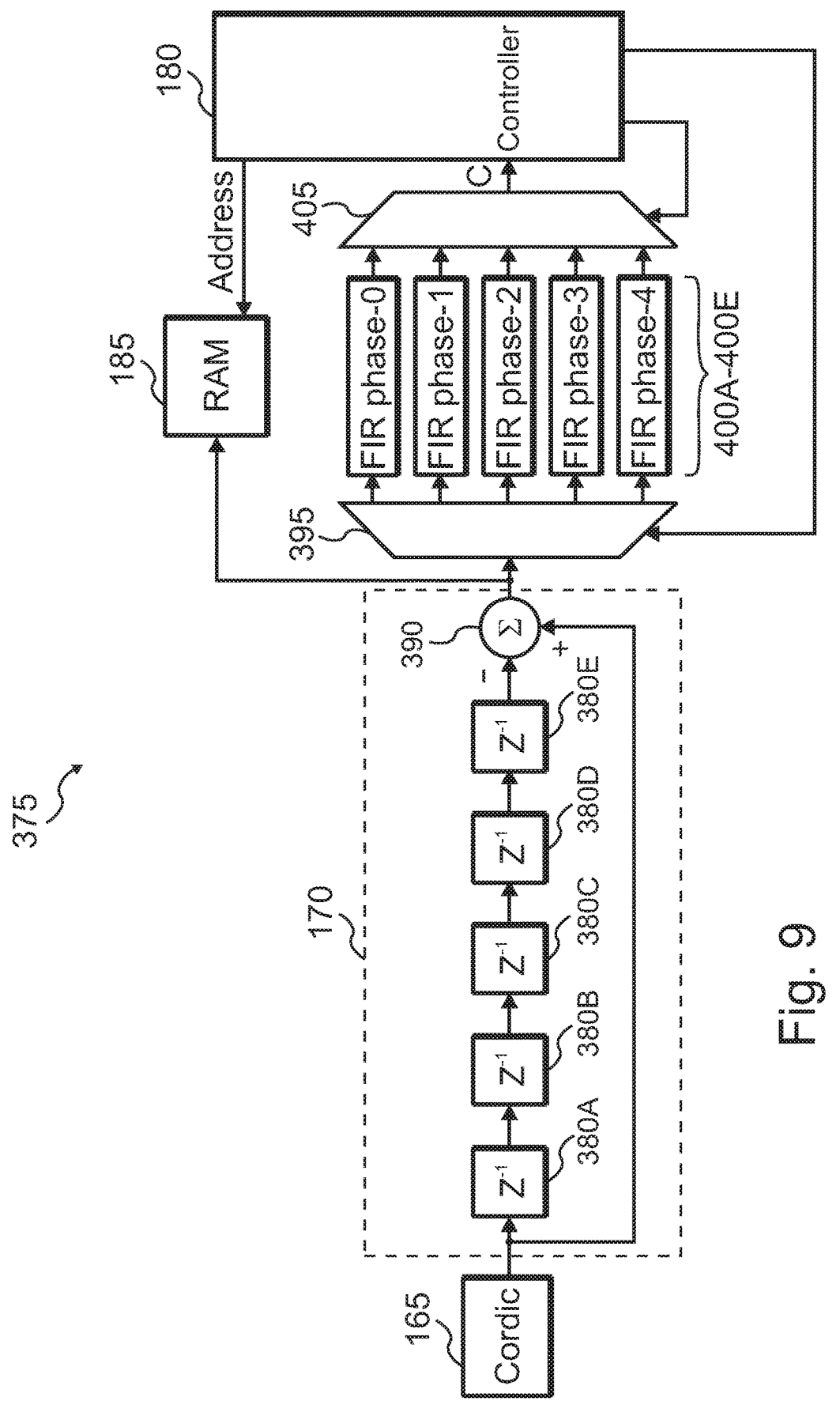
FIG. 9 shows a circuit arrangement for a synchronization header (SHR) detector according to an exemplary embodiment.

A variety of SFDs may be used in SFD 48. One example is shown in FIG. 9, which may be used to detect the Access Address in LE-coded packets, described above. FIG. 9 depicts a circuit arrangement 375 that includes differentiator 170 and a correlator that includes demultiplexer (DeMUX) 395, FIR filters 400A-400E (labeled as "FIR phase-0" through "FIR phase-4," respectively), and MUX 405 (the output signal of the correlator (labeled "C") is provided to controller 180. The example shown corresponds to the situation where an over-sampling rate of 5 is used, i.e., 5 samples per symbol is the sampling rate used by Coordinate Rotation Digital Computer (Cordic) (or Cordic circuit) 165.

Differentiator 170 runs or is clocked at the sample rate. Differentiator 170 includes a cascade coupling of 5 delay circuits, labeled 380A-380E. The phase output of Cordic 165 drives the input of delay circuit 380A. The output of delay circuit 380A drives the input of delay circuit 380B, and so on. The output of delay circuit 380E drives the negative input of subtractor 390. The input signal of delay circuit 380A also drives the positive input of subtractor 390. Subtractor 390 subtracts the output of delay circuit 380E from the input signal of delay circuit 380A and provides the result as the output signal of differentiator 170.

The output of differentiator 170 drives the input of DeMUX 395. In response to a control signal from controller 180, DeMUX 395 provides its input signal to a corresponding one of FIR filters 400A-400E. FIR filters 400A-400E provide the correlation function described above, using coefficients that may be selected or populated as described above. Phase values of the input signal of differentiator 170 determine which of the FIR filters 400A-400E processes the signals provided to the correlator. The input signals to the FIR filters 400A-400E are processed in a circular fashion as controlled by the controller through DeMUX 395 irrespective of the phase values. For example, sample N at the differentiator output 170 is applied to FIR filter 400A, sample N+1 at the differentiator output 170 is applied to FIR filter 400B, and so on. In this example the DeMUX 395 wraps when sample N+5 at the differentiator output 170 is applied to FIR filter 400A. MUX 405 is selected by controller 180 in synchronicity to DeMUX 395, e.g. when a sample is applied to the input of FIR filter 400A, then MUX 405 is selected to convey the output of FIR filter 400A to controller 180. The outputs of FIR filters 400A-400E are provided to MUX 405. In response to a control signal from controller 180, MUX 405 provides one of the output signals of FIR filters 400A-400E as the output signal (labeled "C") of the correlator. As noted, controller 180 detects when the output signal "C" peaks, and takes appropriate action. For example, in some embodiments, when output signal "C" exceeds a threshold, controller 180 may cause the correlator to run for several more samples and then select the peak correlation value from among the samples.

Figure 10:
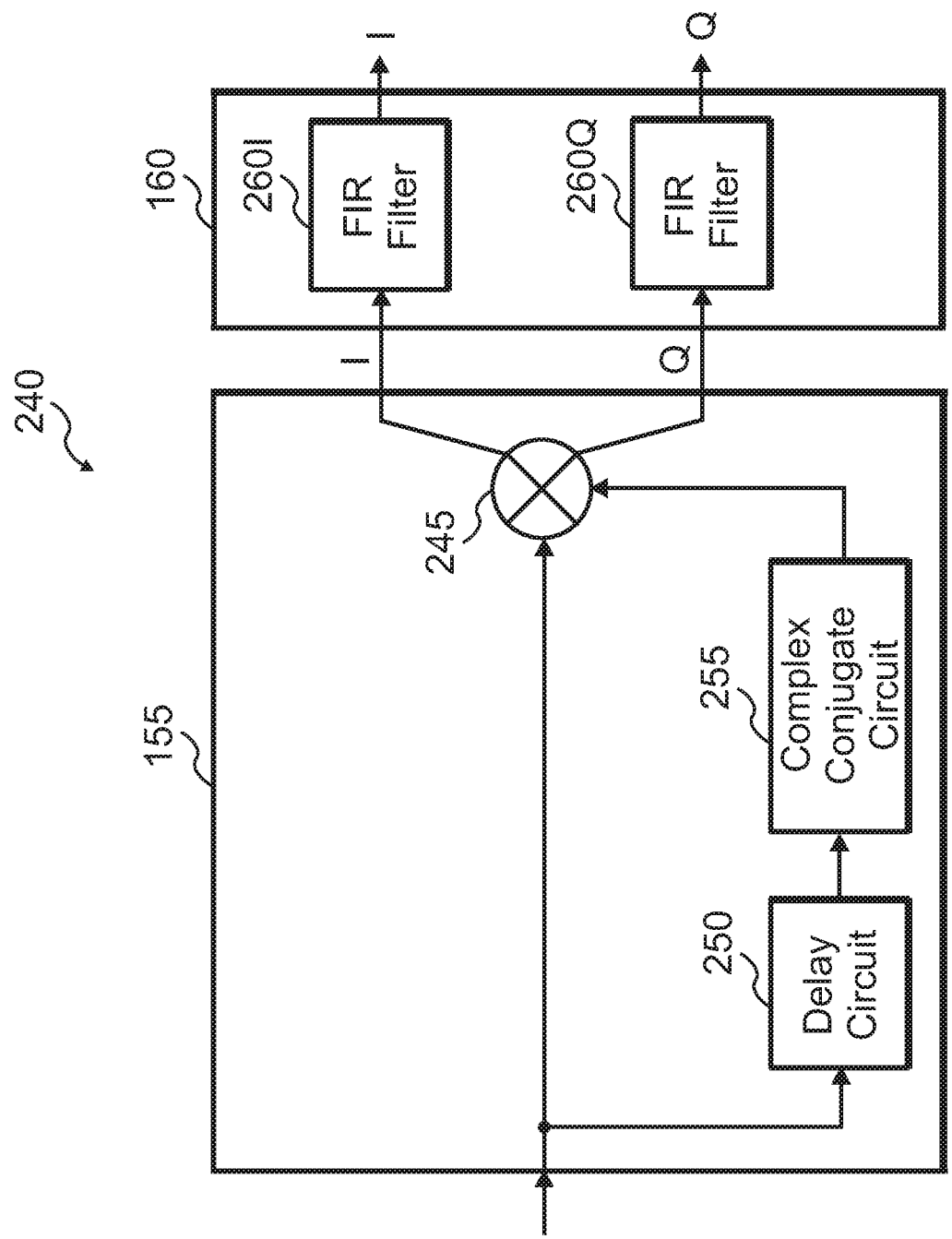
FIG. 10 shows a circuit arrangement for an SHR detector according to an exemplary embodiment.

FIG. 10 shows a circuit arrangement for another SF detector according to an exemplary embodiment. The SF detector in FIG. 10 may be used for uncoded packets, as described above. FIG. 10 depicts a circuit arrangement 240 that includes frequency discriminator 155 and correlator 160. The input signal of frequency discriminator 155, a sampled time-domain signal in I and Q phase, is provided to both delay circuit 250 and to multiplier 245. Delay circuit 250 delays the input signal by a desired amount of delay, to generate a delayed signal. The delay in some embodiments is one clock cycle (of the clock signal clocking frequency discriminator 155 and other circuitry), although in other embodiments different amounts or cycles of delay may be used, as desired.

In exemplary embodiments, delay circuit 250 may use a sample rate such that the modulation used to modulate the RF signal causes a phase change of $$+\frac{\pi}{2} \text{ or } -\frac{\pi}{2}$$

radians (plus or minus 90 degrees) per sample period. Regardless of the implementation details, the delayed signal at the output of delay circuit 250 is provided to complex conjugate circuit 255. Complex conjugate 255 generates the complex conjugate of its input signal, and provides the result to multiplier 245. For example, suppose that the delayed signal is represented by x+jy, where x and y represent, respectively, the real and imaginary parts of the signal, and j represents $\sqrt{-1}$. In that situation, the output of complex conjugate circuit would be the complex conjugate of x+jy, or x−jy.

Multiplier 245 multiplies the input signal of frequency discriminator 155 and the output signal of complex conjugate signal to generate a complex output signal, denoted by a signal labeled "I" and a signal labeled "Q." The complex output signal of multiplier, i.e., the output signal of frequency discriminator 155, drive the inputs of correlator 160.

Correlator 160 includes a pair of finite impulse response (FIR) filters. More specifically, FIR filter 260I is coupled to receive the "I" signal from frequency discriminator 155. Conversely, FIR filter 260Q is coupled to receive the "Q" signal from frequency discriminator 155. FIR filter 260I filters its input signal using a desired transfer function. Similarly, FIR filter 260Q filters its input signal using a desired transfer function. FIR filters 260I and 260Q provide a complex signal, including an "I" signal and a "Q" signal, as the output signal of correlator 260. In exemplary embodiments, FIR filters 260I and 260Q constitute complex filters. In exemplary embodiments, oversampling is used in circuit arrangement 240, depending on factors such as the type of signal (e.g., the type of modulation) received.

In exemplary embodiments, a search pattern may be programmed into FIR filters 260I-260Q. In other words, filter coefficients may be programmed into or used in FIR filters 260I-260Q that correspond to the desired search pattern or, put another way, the filter coefficients are derived from the expected modulation pattern. For example, if a SYNCH word address is known, the address may be programmed into FIR filters 260I-260Q.

In this manner, FIR filters 260I-260Q operate as a correlator. More specifically, correlator 160 correlates the phase of the output signal of frequency discriminator 155 with an a priori phase pattern (e.g., a pattern that is programmed into the filter coefficients) or, put another way, functions as a phase pattern recognition or search circuit. If a matching pattern is found during the search, the magnitude of the complex vector at the output of FIR filters 260I-260Q and, hence, the magnitude output of Cordic 165 would exhibit an increase or spike, which would then cause detector 175 (see FIG. 11, discussed below) to detect signal arrival.

In exemplary embodiments, a variety of search patterns may be programmed into FIR filters 260I-260Q. For example, in some embodiments a search pattern may be programmed or used that searches for the preamble or part of the preamble. As another example, in some embodiments a search pattern may be programmed or used that searches for the SYNCH word or part of the SYNCH word. As another example, in some embodiments a search pattern may be programmed or used that searches for part of the preamble and part of the SYNCH word.

In exemplary embodiments, the programming of FIR filters 260I-260Q with the desired filter coefficients may be performed in a variety of ways, as desired. As an example, in some embodiments, a controller (not shown) may be used to program the filter coefficients in FIR filters 260I-260Q. Other details regarding circuit arrangement 240 are described in U.S. application Ser. No. 15/370,674, referenced above.

Figure 11:
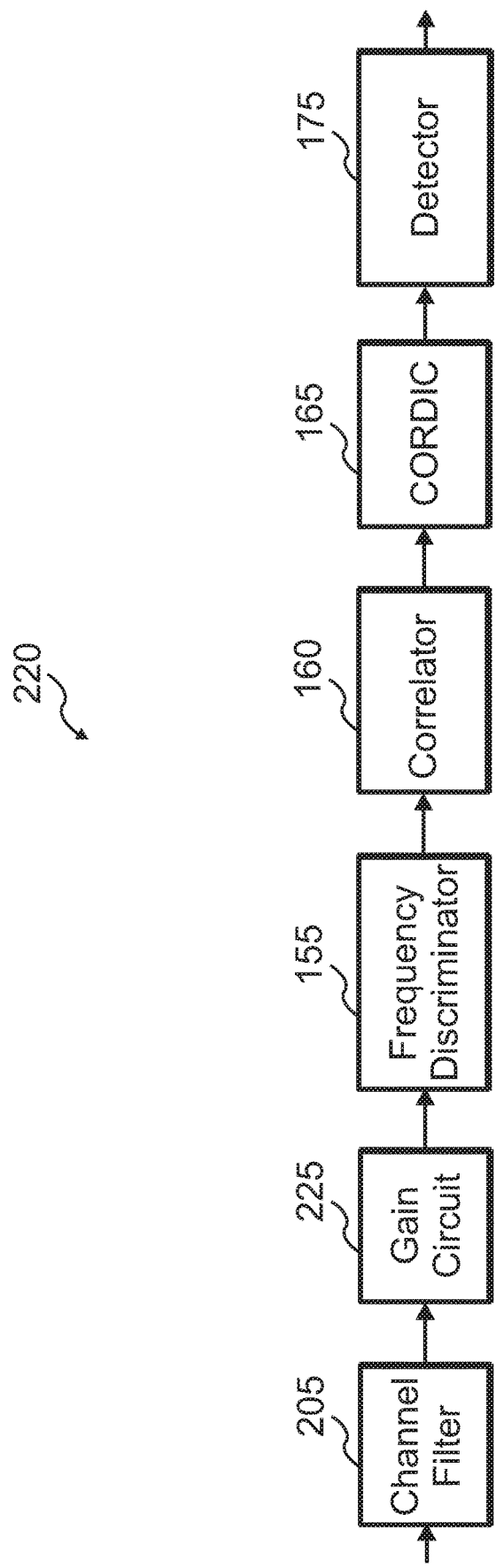
FIG. 11 shows a circuit arrangement for receive path circuitry that includes an SHR detector according to an exemplary embodiment.

FIG. 11 shows a circuit arrangement for receive path circuitry that includes frequency discriminator 155 and correlator 160. One or more gain control stages may be used before frequency discriminator 155, such as gain circuit 225. In the embodiment shown, channel filter 205 is used, and a gain circuit 225 is coupled between the output of channel filter 205 and frequency discriminator 155.

The output signal of frequency discriminator 155 is proportional to $A^2$, where A represents the amplitude of the input signal to frequency discriminator 155. Relatively high noise levels or automatic gain control (AGC) action might impact the magnitude of signal A. Amplitude scaling via gain circuit 225 is used so that the output signals of correlator 160 (magnitude) is independent of the input signal (A). Using the gain control stage(s), such as gain circuit 225, helps to reduce the data path length or reduce the data path length to a minimum in order to reduce the semiconductor area (e.g., in an IC used to implement the circuitry in FIG. 11) and also to reduce power consumption.

In the embodiment shown in FIG. 11, gain circuit 225 is coupled between the output of channel filter 205 and frequency discriminator 155. Gain control stage(s), however, may be used or placed in other locations in the receive path circuitry in other embodiments, as desired.

As an alternative or in addition to using gain circuit 225, in some embodiments, the threshold value used by detector 175 may be scaled. As another alternative or in addition to using gain circuit 225, in some embodiments, the input signals of FIR filters 260I-260Q may be scaled, which results in hardware reduction or savings in FIR filters 260I-260Q. Other details regarding circuit arrangement 240 are described in U.S. application Ser. No. 15/370,674, referenced above.

Figure 12:
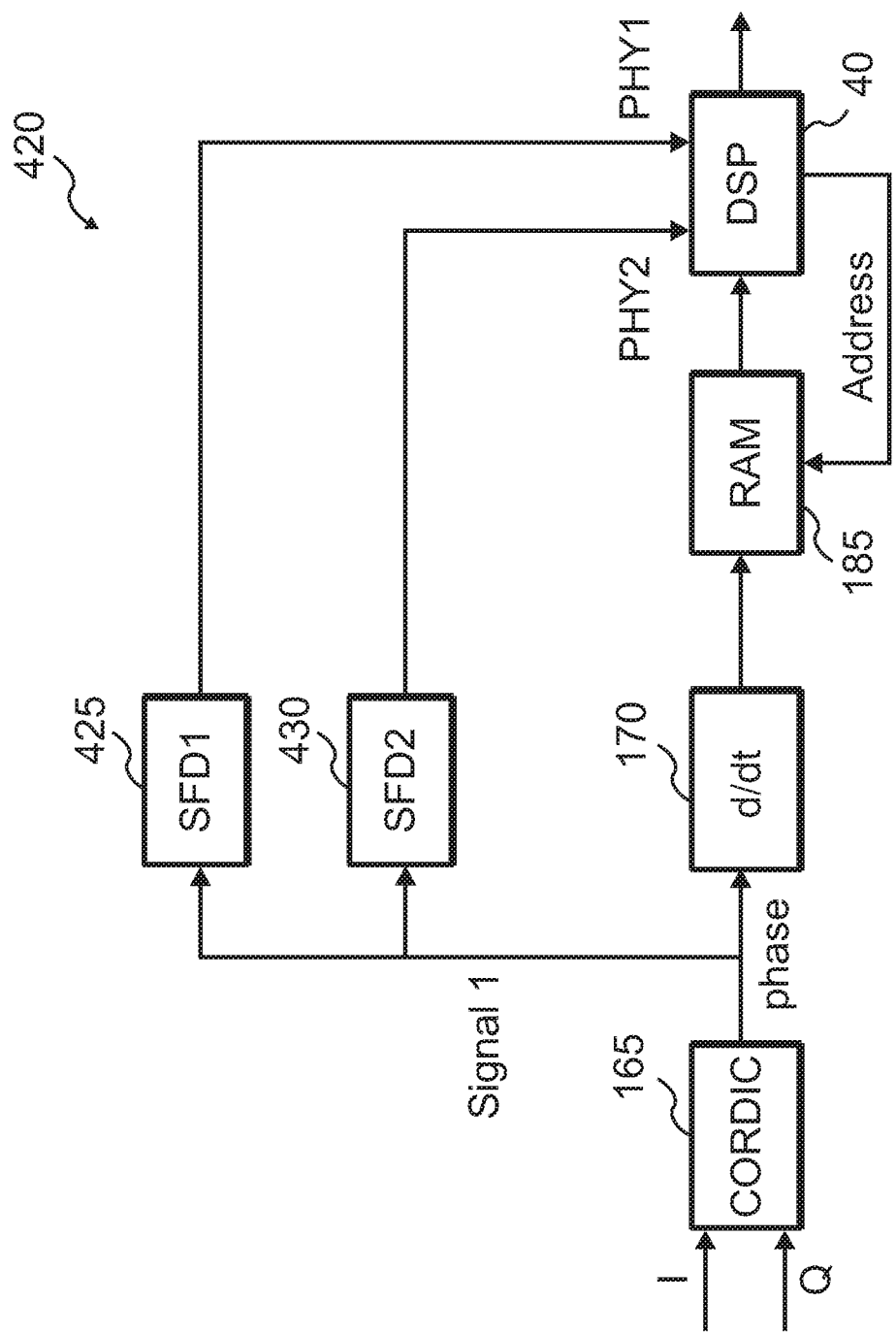
FIG. 12 shows a circuit arrangement for receive path circuitry that includes separate preamble detectors according to an exemplary embodiment.

FIG. 12 shows a circuit arrangement 420 for receive path circuitry that includes separate preamble detectors according to an exemplary embodiment. In this embodiment, the phase output of Cordic 165 feeds the inputs of SFD1 and SFD2, as well as the input of differentiator 170. The output of differentiator 170 is provided to RAM 185. Output data from RAM 185 are provided to DSP 40 (corresponding to part, or all, of signal processing circuitry 40 in FIGS. 1-2). Referring again to FIG. 12, DSP 40 provides address signals to RAM 185, which are used to access information in RAM 185.

More specifically, DSP 40 processes the samples in RAM 185. The samples in RAM 185 are typically oversampled (e.g., multiple bits per symbol or chip), so that DSP 40 has to recover timing. DSP 40 can also perform dispreading or FEC decoding, e.g., Viterbi decoding. DSP 40 may be implemented with dedicated logic or with a generic DSP, e.g. with a Multiply and Add stage and instruction memory (not drawn). DSP 40 may also have a combination of a generic DSP, plus one or more hardware accelerators, such as FIR filter, a Cordic, or correlator. SFD1 may share hardware with SFD2. Also, SFD1 and SFD2 may share hardware with DSP 40. Note that DSP 40 in some embodiments may realize the functionality of both SFD1 and SFD2, as desired.

SFD1 and SFD2 provide PHY1 and PHY2 signals to indicate detection of packets corresponding to PHY1 or PHY2 modes used to configure or transmit the packets. For example, SFD1 may assert the PHY1 signal to indicate detection of SF corresponding to LE-uncoded packets, whereas SFD2 may assert the PHY2 signal to indicate detection of SF corresponding to LE-coded packets. DSP 40 is configured based on the outputs of SFD1 and SFD2 to use either PHY1 or PHY2 circuitry (corresponding to PHY1 and PHY2 modes, respectively) to further process the packets, as described above. DSP 40 provides as an output received data from packets that were transmitted using the PHY1 mode of the PHY2 mode (e.g., LE-uncoded or LE-coded).

Typically, after the RF receiver is enabled, either the I and Q samples or the differentiated phase is stored in RAM 185, which is used as a circular buffer. In the case of Bluetooth LE coded and uncoded packets or PHY modes, RAM 185 is loaded with differentiated phase (i.e., output of differentiator 170). Consequently, after SF triggering, the data in RAM 185 can be used to extract the modulated data regardless of which SFD triggered (or indicated SF detection by asserting signal PHY1 or PHY2).

Figure 13:
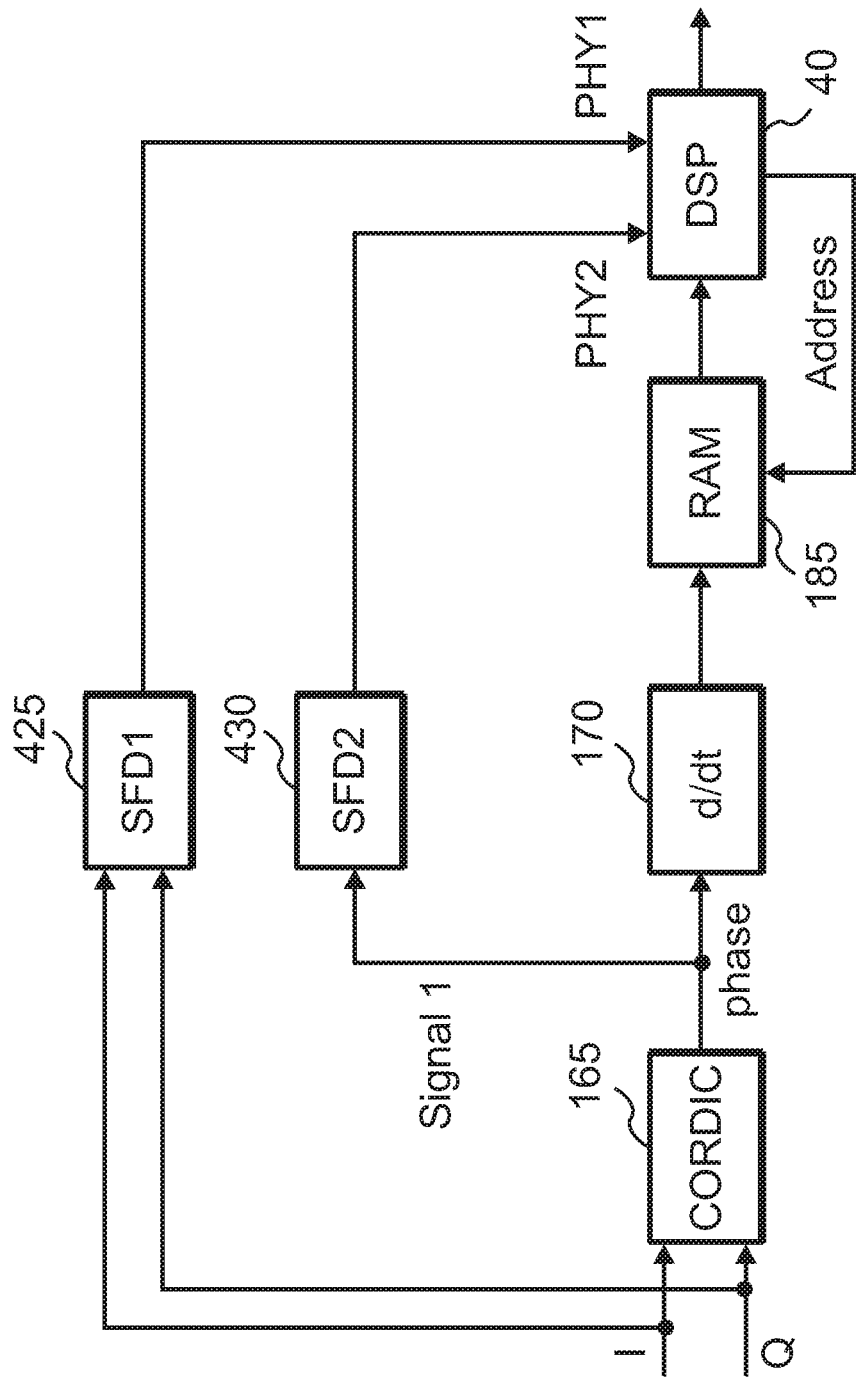
FIG. 13 shows a circuit arrangement for receive path circuitry that includes separate preamble detectors according to an exemplary embodiment.

FIG. 13 shows a circuit arrangement for receive path circuitry that includes separate preamble detectors according to an exemplary embodiment. Similar to the circuit of FIG. 12, the circuit in FIG. 13 includes SFD1 and SFD2. Similarly, SFD2 is fed from the output of Cordic 165, labeled "Signal 1." Unlike the circuit in FIG. 12, the circuit in FIG. 13, SFD1 is fed from the I and Q signals that are also provided to the input of Cordic 165. As an alternative to the embodiment shown in FIG. 13, both SFD1 and SFD2 may receive and operate (e.g., detect by using the Access Address field) on the I and Q signals that also feed the input of Cordic 165.

Figure 14:
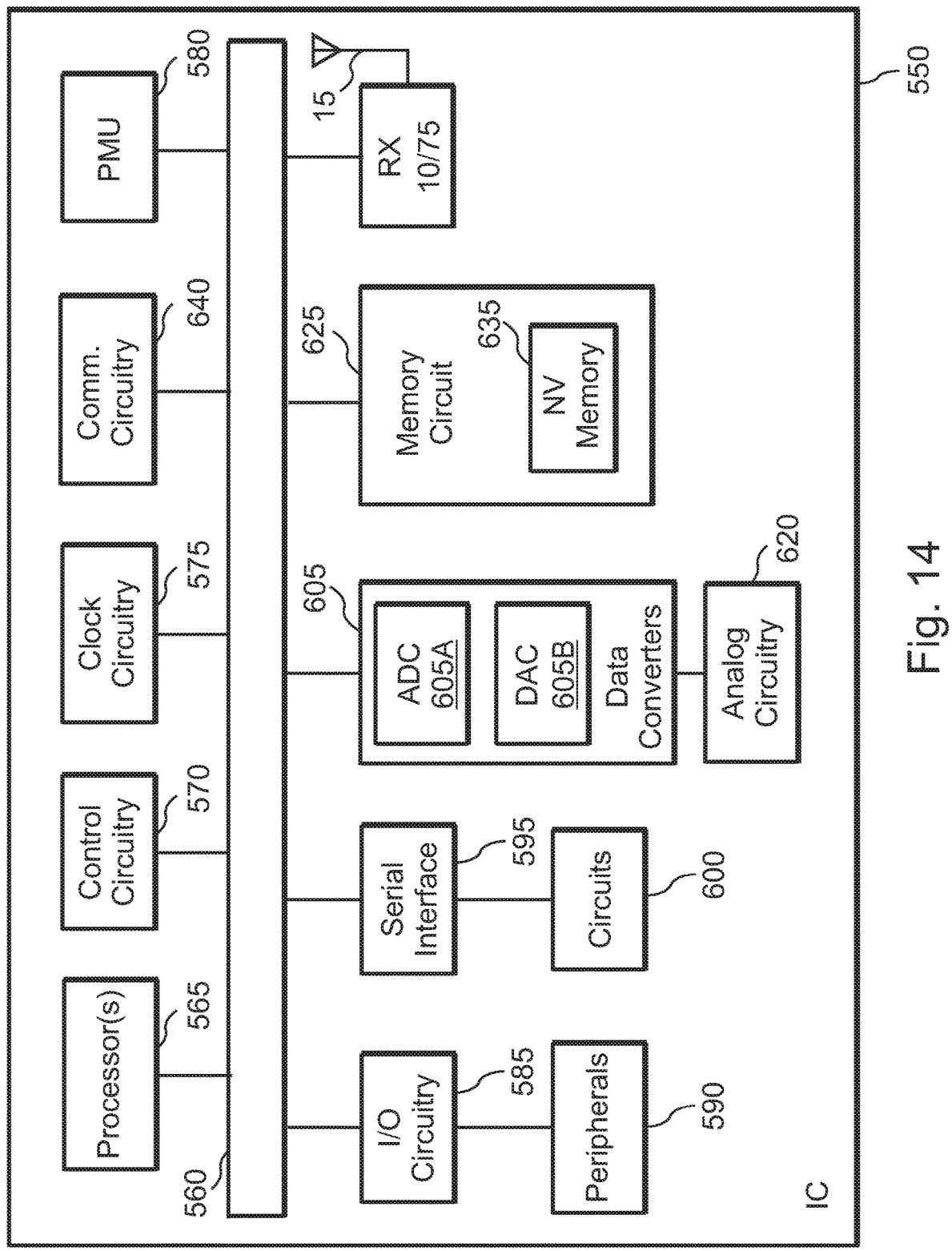
FIG. 14 shows a block diagram of an IC according to an exemplary embodiment.

RF receivers, including SFD 48, may be used in a variety of circuits, blocks, subsystems, and/or systems. For example, in some embodiments, such RF receivers may be integrated in an IC, such as an MCU. FIG. 14 shows a circuit arrangement for such an exemplary embodiment.

The circuit arrangement includes an IC 550, which constitutes or includes an MCU. IC 550 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductor elements (e.g., traces, devices, etc.) for communicating information, such as data, commands, status information, and the like.

IC 550 may include link 560 coupled to one or more processors 565, clock circuitry 575, and power management circuitry or power management unit (PMU) 580. In some embodiments, processor(s) 565 may include circuitry or blocks for providing information processing (or data processing or computing) functions, such as central-processing units (CPUs), arithmetic-logic units (ALUs), and the like. In some embodiments, in addition, or as an alternative, processor(s) 565 may include one or more DSPs. The DSPs may provide a variety of signal processing functions, such as arithmetic functions, filtering, delay blocks, and the like, as desired. In some embodiments, functionality of parts of receiver 10/75, such as those described above, may be implemented or realized using some of the circuitry in processor(s) 565, as desired.

Referring again to FIG. 14, clock circuitry 575 may generate one or more clock signals that facilitate or control the timing of operations of one or more blocks in IC 550. Clock circuitry 575 may also control the timing of operations that use link 560, as desired. In some embodiments, clock circuitry 575 may provide one or more clock signals via link 560 to other blocks in IC 550.

In some embodiments, PMU 580 may reduce an apparatus's (e.g., IC 550) clock speed, turn off the clock, reduce power, turn off power, disable (or power down or place in a lower power consumption or sleep or inactive or idle state), enable (or power up or place in a higher power consumption or normal or active state) or any combination of the foregoing with respect to part of a circuit or all components of a circuit, such as one or more blocks in IC 550. Further, PMU 580 may turn on a clock, increase a clock rate, turn on power, increase power, or any combination of the foregoing in response to a transition from an inactive state to an active state (including, without limitation, when processor(s) 565 make a transition from a low-power or idle or sleep state to a normal operating state).

Link 560 may couple to one or more circuits 600 through serial interface 595. Through serial interface 595, one or more circuits or blocks coupled to link 560 may communicate with circuits 600. Circuits 600 may communicate using one or more serial protocols, e.g., SMBUS, I²C, SPI, and the like, as person of ordinary skill in the art will understand.

Link 560 may couple to one or more peripherals 590 through I/O circuitry 585. Through I/O circuitry 585, one or more peripherals 590 may couple to link 560 and may therefore communicate with one or more blocks coupled to link 560, e.g., processor(s) 365, memory circuit 625, etc.

In exemplary embodiments, peripherals 590 may include a variety of circuitry, blocks, and the like. Examples include I/O devices (keypads, keyboards, speakers, display devices, storage devices, timers, sensors, etc.). Note that in some embodiments, some peripherals 590 may be external to IC 550. Examples include keypads, speakers, and the like.

In some embodiments, with respect to some peripherals, I/O circuitry 585 may be bypassed. In such embodiments, some peripherals 590 may couple to and communicate with link 560 without using I/O circuitry 585. In some embodiments, such peripherals may be external to IC 550, as described above.

Link 560 may couple to analog circuitry 620 via data converter(s) 605. Data converter(s) 605 may include one or more ADCs 605A and/or one or more DACs 605B.

ADC(s) 605A receive analog signal(s) from analog circuitry 620, and convert the analog signal(s) to a digital format, which they communicate to one or more blocks coupled to link 560. Conversely, DAC(s) 605B receive digital signal(s) from one or more blocks coupled to link 560, and convert the digital signal(s) to analog format, which they communicate to analog circuitry 620.

Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 550 to form more complex systems, sub-systems, control blocks or systems, feedback systems, and information processing blocks, as desired.

Control circuitry 570 couples to link 560. Thus, control circuitry 570 may communicate with and/or control the operation of various blocks coupled to link 560 by providing control information or signals. In some embodiments, control circuitry 570 also receives status information or signals from various blocks coupled to link 560. In addition, in some embodiments, control circuitry 570 facilitates (or controls or supervises) communication or cooperation between various blocks coupled to link 560.

In some embodiments, control circuitry 570 may initiate or respond to a reset operation or signal. The reset operation may cause a reset of one or more blocks coupled to link 560, of IC 550, etc., as person of ordinary skill in the art will understand. For example, control circuitry 570 may cause PMU 580, and circuitry such as RF receiver 10/75, to reset to an initial or known state.

In exemplary embodiments, control circuitry 570 may include a variety of types and blocks of circuitry. In some embodiments, control circuitry 570 may include logic circuitry, finite-state machines (FSMs), or other circuitry to perform operations such as the operations described above.

Communication circuitry 640 couples to link 560 and also to circuitry or blocks (not shown) external to IC 550. Through communication circuitry 640, various blocks coupled to link 560 (or IC 550, generally) can communicate with the external circuitry or blocks (not shown) via one or more communication protocols. Examples of communications include USB, Ethernet, and the like. In exemplary embodiments, other communication protocols may be used, depending on factors such as design or performance specifications for a given application, as person of ordinary skill in the art will understand.

As noted, memory circuit 625 couples to link 560. Consequently, memory circuit 625 may communicate with one or more blocks coupled to link 560, such as processor(s) 365, control circuitry 570, I/O circuitry 585, etc.

Memory circuit 625 provides storage for various information or data in IC 550, such as operands, flags, data, instructions, and the like, as persons of ordinary skill in the art will understand. Memory circuit 625 may support various protocols, such as double data rate (DDR), DDR2, DDR3, DDR4, and the like, as desired.

In some embodiments, memory read and/or write operations by memory circuit 625 involve the use of one or more blocks in IC 550, such as processor(s) 565. A direct memory access (DMA) arrangement (not shown) allows increased performance of memory operations in some situations. More specifically, DMA (not shown) provides a mechanism for performing memory read and write operations directly between the source or destination of the data and memory circuit 625, rather than through blocks such as processor(s) 565.

Memory circuit 625 may include a variety of memory circuits or blocks. In the embodiment shown, memory circuit 625 includes non-volatile (NV) memory 635. In addition, or instead, memory circuit 625 may include volatile memory (not shown), such as random access memory (RAM). NV memory 635 may be used for storing information related to performance, control, or configuration of one or more blocks in IC 550. For example, NV memory 635 may store configuration information related to RF receiver 10/75 and/or to initial or ongoing configuration or control of RF receiver 10/75, as desired.

Various circuits and blocks described above and used in exemplary embodiments may be implemented in a variety of ways and using a variety of circuit elements or blocks. For example, the circuitry and blocks shown in FIGS. 1-14 may generally be implemented using digital circuitry, analog circuitry, and/or mixed-signal circuitry. The digital circuitry may include circuit elements or blocks such as gates, digital multiplexers (MUXs), latches, flip-flops, registers, finite state machines (FSMs), processors, programmable logic (e.g., field programmable gate arrays (FPGAs) or other types of programmable logic), arithmetic-logic units (ALUs), standard cells, custom cells, etc., as desired, and as persons of ordinary skill in the art will understand. In addition, analog circuitry or mixed-signal circuitry or both may be included, for instance, power converters, discrete devices (transistors, capacitors, resistors, inductors, diodes, etc.), and the like, as desired. The analog circuitry may include bias circuits, decoupling circuits, coupling circuits, supply circuits, current mirrors, current and/or voltage sources, filters, amplifiers, converters, signal processing circuits (e.g., multipliers), detectors, transducers, discrete components (transistors, diodes, resistors, capacitors, inductors), analog MUXs and the like, as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus, comprising:
a radio frequency (RF) receiver that receives packets, the RF receiver comprising first and second synchronization field detectors (SFDs) that detect synchronization headers generated using first and second physical layer (PHY) modes, respectively, wherein the first PHY mode is different than the second PHY mode, and wherein the first SFD receives an input signal of a Coordinate Rotation Digital Computer (Cordic) circuit, and wherein the second SFD receives an output signal of the Cordic circuit.

2. The apparatus according to claim 1, wherein the first PHY mode corresponds to uncoded packets.

3. The apparatus according to claim 1, wherein the second PHY mode corresponds to coded packets.

4. The apparatus according to claim 1, wherein the first and second SFDs generate, respectively, first and second output signals, to indicate detection of the synchronization headers generated using the first and second PHY modes, respectively.

5. The apparatus according to claim 4, further comprising a demodulator that uses the first PHY mode or the second PHY mode to demodulate the packets depending on whether the first or second output signal indicates detection of a synchronization header.

6. The apparatus according to claim 1, wherein the first SFD detects the synchronization headers generated using a Bluetooth low energy (LE) uncoded PHY mode.

7. The apparatus according to claim 1, wherein the second SFD detects the synchronization headers generated using a Bluetooth low energy (LE) coded PHY mode.

8. The apparatus according to claim 1, wherein rather than receiving the input signal of the Cordic circuit, the first SFD receives the output signal of the Cordic circuit.

9. An apparatus, comprising:
a radio frequency (RF) receiver that receives packets transmitted using one of first and second physical layer (PHY) modes, wherein the first PHY mode is different than the second PHY mode, the RF receiver comprising:
a synchronization field detector (SFD) that detects a synchronization header generated using either the first PHY mode or the second PHY mode, wherein the SFD receives an input signal of a Coordinate Rotation Digital Computer (Cordic) circuit, and wherein the SFD receives an output signal of the Cordic circuit; and
a demodulator that demodulates a packet in the received packets using either the first PHY mode or the second PHY mode depending on whether the SFD detects that the synchronization header is generated using the first PHY mode or the second PHY mode.

10. The apparatus according to claim 9, wherein the SFD comprises:
   a first SFD that detects the synchronization headers if generated using the first PHY mode; and
   a second SFD that detects the synchronization headers if generated using the second PHY mode.

11. The apparatus according to claim 10, wherein the first and second SFDs operate concurrently on the received packets.

12. The apparatus according to claim 9, wherein the SFD provides first and second signals to the demodulator to indicate detection that the synchronization header is generated using the first PHY mode or the second PHY mode.

13. The apparatus according to claim 12, wherein the demodulator is configured to demodulate using the first PHY mode or the second PHY mode depending on whether the first signal or the second signal is asserted.

14. A method of operating a radio frequency (RF) receiver to receive packets, the method comprising:
   using first and second synchronization field detectors (SFDs) to detect synchronization headers generated using first and second physical layer (PHY) modes, respectively,
   wherein the first PHY mode is different than the second PHY mode, and wherein the first SFD receives an input signal of a Coordinate Rotation Digital Computer (Cordic) circuit, and wherein the second SFD receives an output signal of the Cordic circuit.

15. The method according to claim 14, wherein the first PHY mode corresponds to uncoded packets.

16. The method according to claim 14, wherein the second PHY mode corresponds to coded packets.

17. The method according to claim 14, further comprising demodulating a packet in the received packets depending on whether the first SFD detects that a synchronization header corresponding to the packet was generated using the first PHY mode or whether the second SFD detects that the synchronization header corresponding to the packet was generated using the second PHY mode.

18. The method according to claim 14, further comprising asserting first and second signals, by using the first and second SFDs, to indicate detection of the synchronization headers generated using the first and second PHY modes, respectively.

19. The method according to claim 18, further comprising demodulating a packet in the received packets depending on whether the first signal or the second signal is asserted.

20. The method according to claim 14, wherein the first SFD detects the synchronization headers generated using a Bluetooth low energy (LE) uncoded PHY mode, and wherein the second SFD detects the synchronization headers generated using a Bluetooth low energy (LE) coded PHY mode.

* * * * *